Patented Apr. 26, 1932

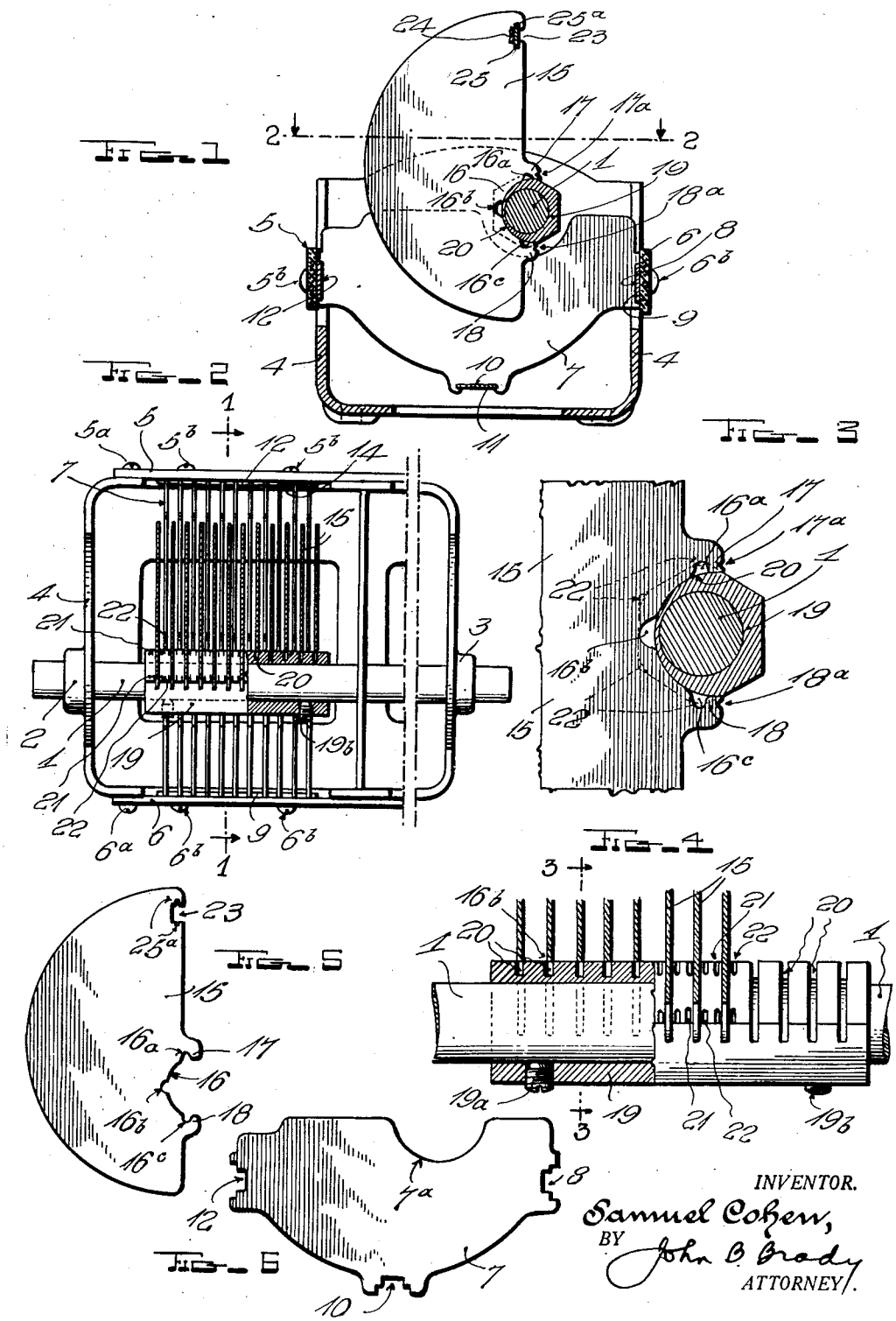

1,855,940

UNITED STATES PATENT OFFICE

SAMUEL COHEN, OF BROOKLYN, NEW YORK, ASSIGNOR TO GENERAL INSTRUMENT CORPORATION, OF NEW YORK, N. Y., A CORPORATION OF NEW YORK

VARIABLE CONDENSER

Application filed December 13, 1929. Serial No. 413,924.

My invention relates broadly to variable condensers and more particularly to means for mounting the rotor plates of variable condensers.

One of the objects of my invention is to provide an improved form of mounting for the rotor plates in a variable condenser by which a solid rotor construction may be obtained and the rotor plates secured against angular displacement which may cause inaccuracies in the capacity of the condenser.

Another object of my invention is to provide a construction of mounting for the rotor plates of a variable condenser wherein a multiplicity of plates may be mounted in spaced parallel planes and maintained against displacement by wedging the material of the supporting means adjacent the base of the rotor plates.

A further object of my invention is to provide a construction of sleeve comb which is grooved at spaced intervals to receive the edges of the rotor plates of the variable condenser system where the rotor plates may be deformed out of shape for locking the plates in position in parallel planes positively spaced with respect to a set of stator plates.

A still further object of my invention is to provide a construction of rotor plate and sleeve comb for the mounting of a multiplicity of rotor plates in parallel spaced planes wherein the sleeve comb has eccentrically cut slots therein to receive preformed edges of the rotor plates for maintaining such plates in parallel planes in definite spacial relation to an associated set of stator plates.

Other and further objects of my invention reside in the construction of a rotor plate and means for mounting such plate in a slotted comb for actuation by a rotary shaft for varying the spacial relation of a set of rotor plates with respect to a set of stator plates as more fully described in the specification hereinafter following by reference to the accompanying drawings, in which:

Figure 1 is a cross-sectional view taken through a variable condenser on line 1—1 of Figure 2 in which the rotor plates are mounted in accordance with my invention; Fig. 2 is a plan view of the variable condenser of Fig. 1 with parts broken away and shown in cross-section and with the rotor plates shown in cross-section on line 2—2 of Fig. 1; Fig. 3 is an enlarged cross-sectional view on line 3—3 of Fig. 4 showing the manner in which a rotor plate may be set into the slotted comb which is carried by the rotary shaft of the variable condenser; Fig. 4 is a side view of the sleeve-like comb partially broken away and shown in cross-section and illustrating several of the rotor plates set in position in the sleeve; Fig. 5 is a plan view of the rotor plate showing the construction by which the plate may be mounted in the sleeve-like comb; and Fig. 6 is a plan view of the associated stator plate which is employed in the variable condenser.

Referring more particularly to the drawings, reference character 1 designates the rotary shaft of the variable condenser system which is journaled at 2 and 3 in the frame structure 4. Insulated strips 5 and 6 are secured at 5a and 6a to frame 4 and extend longitudinally of the frame structure 4 and provide a supporting means for the stator plates 7. The stator plates are cut away, as indicated at 8, 10 and 12, and receive strips 9, 11 and 14 by which the plates are rigidly maintained in predetermined spaced relation. Strips 9 and 14 are secured to the insulated longitudinally extending strips 5 and 6 by suitable means, such as screws 5b and 6b which pass through longitudinally extending strips 5 and 6. The stator plates 7 are cut away at 7a to clear the sleeve 19 of the rotor plate system.

In Fig. 2 the condenser system is foreshortened and merely shows one section of the condenser, although it will be understood that a multiplicity of sections are employed in a gang condenser arrangement. The rotor plates are represented at 15 cut away at one side thereof as designated at 16 in a substantially semi-circular cut as shown. The outer edges of the plates are locked in spaced relation by strip 25 which fits in slots 25a in the edges of the plates 15 which are notched at 23. An insulated strip 24 is mounted adjacent strip 25 to prevent short circuit between the stator and rotor plates when the rotor is moved to a position of maximum capacity with respect to the stator. The cut away portion 16 is notched at 16a, 16b and 16c, the notch at 16b being disposed centrally of the cut away portion 16, and the notches 16a and 16c being disposed adjacent opposite ends of the cut away portion 16. The notches 16a and 16c so reduce the cross-section of the protruding tongues 17 and 18 that these tongues are readily bendable to form interlocking connections with the grooved sleeve shown at 19. As shown particularly in Fig. 5 it is advantageous to have the tongues project in a direction parallel to the straight edge of the plate which passes through or close to the rotary shaft. The sleeve 19 fits over rotary shaft 1 and may be secured in position thereon by set screws 19a and 19b. The sleeve 19 is provided with eccentrically disposed slots 20. The sleeve 19 has a hexagonal section, and the slots 20 which are formed at one side thereof are eccentric with respect to the axis of the shaft 1. The plate 15, therefore, may be fitted into the material of the sleeve 19 to a position where notch 16b is wholly covered by the slotted sleeve and permits the rotor plates to be set to a position closely conforming to the contour of shaft 1. Notches 16a and 16c are so aligned with respect to the apex portions of the hexagonal sleeve on diametrically opposite points thereof that pressure which is applied against tongues 17 and 18 at the points 17a and 18a serves to wedge the material of tongues 17 and 18 into the slots 20 for locking the rotor plates in position with respect to the sleeve 19. When the rotor plates 15 are all in position a tool operates to simultaneously force the material of tongues 17 and 18 into the slots 20, thereby solidly locking the rotor plates in the sleeve. This operation serves to dense the metal of the rotor plates around the sleeve and effect a locking of the rotor plates in the sleeve. To further secure the rotor plates in the sleeve, pressure is applied to the metal of the sleeve between the plates 15 after they are set in position, as shown more clearly at 21 and 22, which tends to dense the metal of the sleeve about the rotor plates, thereby providing a solid rotor unit for the variable condenser.

I have found that in the construction of rotor plate having a semi-circular notch which is directly fitted into a semi-circular slot in a sleeve on the rotor shaft, as in conventional types of construction, it is impossible to provide sufficient material of the rotor shaft sleeve to anchor the rotor plates thereon. In such prior construction the rotor plates tend to fall out of the rotor shaft sleeve. I have found the construction of my present invention extremely practical, in that the rotor plates are each wedged in the sleeve on the rotor shaft in such manner that ready removal is substantially prevented.

While I have described my invention in one of its preferred embodiments, I desire that it be understood that modifications may be made and that no limitations upon my invention are intended other than are imposed by the scope of the appended claims.

What I claim as new and desire to secure by Letters Patent of the United States is as follows:

1. In a support for the rotor plates of a variable condenser, a rotary member having laterally positioned substantially semi-circular grooves therein extending between anvil faces on opposite sides of said rotary member, rotor plates each having a curved recess in one edge thereof substantially conforming to the contour of the circular groove in said rotary member, said plate having deformable tongues projecting from the edge thereof at opposite extremities of the curved recess therein and extending in directions substantially parallel to the edge of said plate toward the anvil faces on opposite sides of said rotary member, said plate being reduced in area immediately adjacent said deformable tongues and at the opposite limits of said curved recess for increasing the pliability of said deformable tongues for effecting interlocking engagement of said plates with the anvil faces of said rotary member.

2. In a support for the rotor plates of a variable condenser, a rotary member having laterally positioned substantially semi-circular grooves therein extending around said rotary member between diametrically opposite positions thereof, rotor plates each having a curved recess in one edge thereof substantially conforming to the contour of the circular groove in said rotary member, said plate having deformable tongues projecting from the edge thereof at opposite extremities of the curved recess therein and extending in directions substantially parallel to the edge of said plate toward the diametrically opposite ends of the grooves in said rotary member, the curved recess in said plate having a central notch therein and notches on each side thereof immediately adjacent the deformable tongues projecting from the edge of said plate, said notches serving to increase the pliability of the material of said plate adjacent said groove for effecting an interlocking connection between the tongues on said plate and said rotary member.

In testimony whereof I affix my signature.

SAMUEL COHEN.